United States Patent
Cuffaro et al.

(10) Patent No.: US 7,190,673 B2
(45) Date of Patent: Mar. 13, 2007

(54) METHOD AND SYSTEM THAT IMPROVES INTEROPERABILITY OF A RADIO NETWORK CONTROLLER AND A BASE STATION IN CELLULAR SYSTEM WITH DOWNLINK CONGESTION CONTROL

(75) Inventors: Angelo Cuffaro, Laval (CA); Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 1051 days.

(21) Appl. No.: 10/272,873

(22) Filed: Oct. 17, 2002

(65) Prior Publication Data

US 2004/0001436 A1 Jan. 1, 2004

Related U.S. Application Data

(60) Provisional application No. 60/391,851, filed on Jun. 26, 2002.

(51) Int. Cl.
*H04Q 7/00* (2006.01)
(52) U.S. Cl. ................................ 370/235; 370/328
(58) Field of Classification Search ............. None
See application file for complete search history.

(56) References Cited

U.S. PATENT DOCUMENTS

| | | | |
|---|---|---|---|
| 6,449,290 B1 | 9/2002 | Willars et al. | |
| 6,594,238 B1 | 7/2003 | Wallentin et al. | |
| 2002/0037000 A1* | 3/2002 | Park et al. | 370/349 |
| 2002/0075838 A1 | 6/2002 | Choi et al. | |
| 2003/0007480 A1* | 1/2003 | Kim et al. | 370/349 |
| 2005/0262266 A1* | 11/2005 | Wiberg et al. | 709/238 |

FOREIGN PATENT DOCUMENTS

| | | |
|---|---|---|
| CN | 1373943 A | 9/2000 |
| GB | 2368243 | 4/2002 |
| WO | 9857450 | 12/1998 |
| WO | 03-096712 | 11/2003 |

* cited by examiner

*Primary Examiner*—Chi Pham
*Assistant Examiner*—Anh-Vu Ly
(74) *Attorney, Agent, or Firm*—Volpe and Koenig, P.C.

(57) ABSTRACT

A method and system for improving interoperability of a radio network controller and a base station in cellular systems with downlink congestion control is disclosed. A message is sent from a base station to a radio network controller after the base station has discarded at least one transport block. The message sent to the radio network controller may be forwarded by the radio network controller to additional radio network controllers serving users affected by the discard of the at least one transport block.

16 Claims, 1 Drawing Sheet

METHOD AND SYSTEM THAT IMPROVES INTEROPERABILITY OF A RADIO NETWORK CONTROLLER AND A BASE STATION IN CELLULAR SYSTEM WITH DOWNLINK CONGESTION CONTROL

CROSS REFERENCE TO RELATED APPLICATION

This application claims priority from U.S. Provisional Application No. 60/391,851, filed on Jun. 26, 2002, which is incorporated by reference as if fully set forth.

BACKGROUND

The present invention relates to third generation cellular systems having downlink congestion control.

The architecture of third generation cellular systems based on Universal Mobile Telecommunications System (UMTS) standards includes radio network subsystems (RNSs) which comprise radio network controllers (RNCs) and "Node-Bs." The Node-Bs are also referred to as base stations (BSs). The UMTS standards utilize a layer model developed by the International Organization for Standization (ISO). The layer model is the Open Systems International (OSI) seven (7) layer model which provides a common basis for the development of standards for interconnecting systems.

The specific architecture of the layers may vary according to the systems being interconnected. For example, there are three layers in the interface (Uu interface) of a radio network subsystem (RNS) and a user equipment (UE). The three layers perform different functions, but collectively control data transmitted from a RNS to a UE (i.e. the control plane). The first layer, layer 1, is a physical layer which codes, interleaves and multiplexes or otherwise transmits data across physical channels for delivery from a BS to a UE. Layer 1 processing may be performed by the BS. The second layer, layer 2, is a data link layer which ensures that data is properly transmitted by the physical layer. The third layer, layer 3, is a network layer which establishes and terminates connections between upper layers of the RNS and UE.

In order to serve the network-to-user (downlink) connections, a RNC within the RNS performs layer 2 and 3 processing on the incoming data from the core network, and directs blocks of data called "transport blocks" toward the BS serving the user that is to receive the information. The BS performs physical layer processing of the transport blocks (i.e. coding, interleaving, multiplexing) followed by modulation and transmission of the signals.

The RNC which is directly connected to the core network and which performs layer 2 and 3 processing for a given user is said to be the serving RNC (SRNC) of this user. This RNC may not be the same as the RNC that is connected to the BS serving the user, which is said to be the controlling RNC (CRNC) of the BS. When the SRNC and the CRNC are not the same for a given user, the transport blocks of this user are routed transparently by the CRNC to the BS serving the user.

Normally, the BS should process all transport blocks it has received from its CRNC. However, its resources in terms of processing power and transmission power are limited and it may occasionally happen that the BS is unable to process all the transport blocks received from the CRNC and/or transmit the modulated signals with a power sufficient to ensure acceptable reception at the UE. This situation is referred to as a congestion event at the BS. When a congestion event occurs, the BS may have to refrain from processing one or more transport blocks received from the CRNC.

A CRNC should try to avoid the occurrence of congestion events at the BS it controls. Before the CRNC can undertake any congestion-relieving action, however, it has to be aware that congestion events are occurring (or about to occur). Currently, the only mechanism supported by the UMTS standards to make the CRNC aware of the situation at the BS is the reporting of average transmission power from the BS. This mechanism, however, is often insufficient.

As explained previously, the BS may address a congestion event by discarding one or more transport blocks received from the CRNC. If a BS is aggressive in discarding transport blocks, or if the congestion is not caused by a shortage of transmission power, the average transmission power reported by the BS to its CRNC may not increase to a level high enough for the CRNC to trigger a congestion-relieving action. In such situations, the CRNC is not aware that the BS has discarded some of the transport blocks sent to the BS by the CRNC. The CRNC, therefore, may not do anything to address the congestion issue. Furthermore, the BS may continue discarding transport blocks and the effect of this is perceived only at higher layers, such as the radio link control (RLC) sub-layer or higher depending on the RLC mode. This is problematic and, in severe cases, may even cause the RNS to effectively lose control over the quality of service experienced by some users.

A method and system is therefore needed to effectively address congestion by improving the interoperability of an RNC and a BS in cellular systems with downlink congestion control.

SUMMARY

The invention is a method and system to improve interoperability of a radio network controller and a base station in cellular systems with downlink congestion control. The base stations transmit information to their respective radio network controller so that base station congestion may be effectively managed.

BRIEF DESCRIPTION OF THE DRAWING(S)

DETAILED DESCRIPTION OF THE PREFERRED EMBODIMENT(S)

Figure 1:
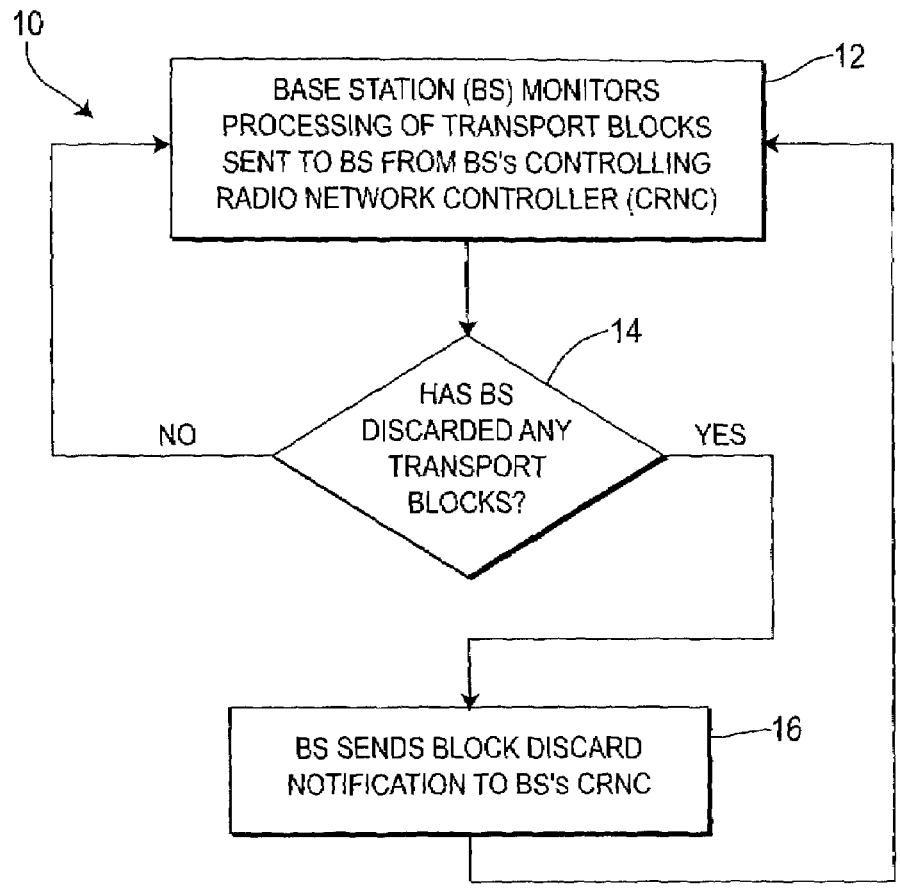
FIG. 1 is a method for improving the interoperability of a radio network controller and a base station wherein a block discard notification is sent by the base station in accordance with an embodiment of the present invention.

Referring initially to FIG. 1, there is shown a method 10 for improving the interoperability of a radio network controller (RNC) and a base station (BS). The method 10 begins in step 12 with a BS monitoring the processing of transport blocks sent to the BS from the BS's controlling radio network controller (CRNC). As mentioned, transport blocks are blocks of data sent to the BS by the CRNC for delivery to particular users. Under normal circumstances, the BS will properly process and deliver all of the transport blocks sent to the BS by the CRNC. It often happens, however, that the number of transport blocks sent to a BS from a CRNC threatens to cause the BS's maximum allowable transmission power to be exceeded. When this happens, the BS may discard one or more of the transport blocks to avoid exceeding its maximum allowable transmission power.

Referring now to step 14, the method determines whether the BS has discarded any transport blocks. If the BS has not discarded any transport blocks, the method returns to step 12 and continues monitoring the processing of incoming transport blocks. If, in contrast, the BS has discarded at least one transport block, the method proceeds to step 16.

In step 16, a message called a block discard notification is sent from the BS to its CRNC 12 indicating that the BS has discarded at least one transport block. The block discard notification notifies the CRNC 12 that the BS is experiencing or has experienced a congestion situation and, as a result, has discarded at least one transport block. The BS is considered to have experienced a congestion event or situation whenever the BS fails to process and transmit a transport block.

There are a number of alternatives related to the manner in which the block discard notification is sent from a BS to a CRNC. For example, the BS can send the number of discarded blocks periodically, i.e. every 5 seconds provided that blocks were discarded. Alternatively, the BS can send the notification based on a threshold. In that case, if the number of discarded blocks exceeds a pre-defined threshold, the BS will notify the CRNC. The threshold may be configured, as desired. For example, the threshold could be set such that whenever 10 out of 100 received blocks are discarded, the BS transmits the block discard notification to the CRNC.

There are similarly a number of alternatives related to the information contained within a block discard notification. More specifically, a block discard notification sent by a BS may contain, for example, information indicating the transport channels and coded composite transport channels, and therefore the users, that have sustained a discard of transport blocks. The block discard notification may also identify the affected slot(s) if congestion is due to lack of transmission power.

With respect to the transport channels that have sustained discard of transport blocks, the notification may include, for each affected transport channel, information pertaining to the interval of time within which transport blocks have been discarded (expressed in terms of the connection frame number); the number of transport blocks which have been discarded during the specified interval of time; and the number of blocks processed, if any.

It is important to note that it is not necessary for a block discard notification to specify the frame handling priority of the transport channels that have sustained discards, as this information is already known by both the CRNC and SRNC. Furthermore, the information about the interval of time may not always be relevant if the signaling delay is too long, as the connection frame number only cycles from 0 to 255 frames.

Sending a block discard notification to the CRNC, allows the CRNC to implement congestion-relieving measures even though reports of average transmission power may not indicate the occurrence of a congestion event. Furthermore, the CRNC may forward the block discard notification sent by the BS to SRNCs serving the users affected by the discard of transport blocks. This is especially useful information for a SRNC if the discarded transport blocks contained important signaling information, as the discard of blocks will almost surely result in the loss of the complete message. This also improves the situation in terms of control of the quality of service, as the SRNC is now aware that the quality of service has been reduced for some users.

Figure 2:
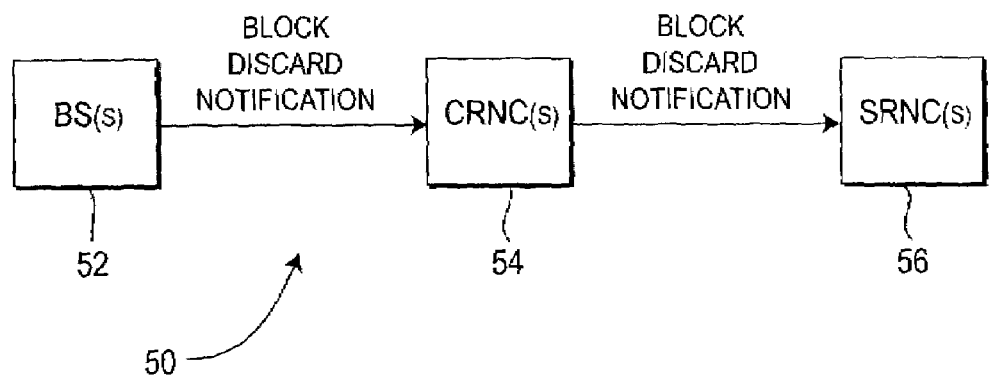
FIG. 2 is a system for improving the interoperability of a radio network controller and a base station wherein a block discard notification is sent by the base station in accordance with an embodiment of the present invention.

Referring now to FIG. 2, there is shown a system 50 wherein a block discard notification is provided to improve interoperability between a RNC and a BS. The system 50 comprises at least one BS 52, at least one CRNC 54 and at least one SRNC 56. When the BS 52 detects that it will be unable to properly process transport blocks sent to it from the CRNC 54, the BS may have to discard at least one of those transport blocks in order to avoid exceeding its maximum allowed transmission power. If the BS does, in fact, discard at least one transport block, it will send a block discard notification, as explained above, to its CRNC 54. The block discard notification provides the CRNC 54 with notice that the BS 52 has discarded at least one transport block. This enables the CRNC 54 to implement congestion relieving measures, as desired, despite the fact that reports of average transmission power may not indicate the occurrence of a congestion event. The block discard notification sent by the BS 52 can also be forwarded by the CRNC 54 to SRNCs serving the users affected by the discard of transport blocks, as explained above.

Although the present invention has been described in detail, it is to be understood that the invention is not limited thereto, and that various changes can be made therein without departing from the spirit and scope of the invention, which is defined by the attached claims.

What is claimed is:

1. A method for communicating between a radio network controller and a base station comprising:

monitoring transport blocks sent from a radio network controller to a base station;

determining whether the base station has discarded at least one transport block sent from the radio network controller to the base station; and sending a block discard notification from the base station to the radio network controller when the determination is positive for preventing downlink congestion:

wherein the radio network controller is a controlling radio network controller: and wherein the controlling radio network controller forwards the block discard notification to serving radio network controllers, the serving radio network controllers serving users affected by the at least one discarded transport block.

2. The method of claim 1 wherein the block discard notification comprises information indicating which transport channels and coded composite transport channels have sustained a discard of at least one transport block.

3. The method of claim 2 wherein the block discard notification further comprises, for each transport channel that has sustained a discard of at least one transport block, the interval of time within which transport blocks have been discarded.

4. The method of claim 3 wherein the block discard notification further comprises, for each transport channel that has sustained a discard of at least one transport block, the number of transport blocks which have been discarded during the specific interval of time.

5. The method of claim 2 wherein the block discard notification further comprises, for the each transport channel that has sustained a discard of at least one transport block, the number of transport blocks processed.

6. A system for improving interoperability of a radio network controller and a base station in cellular systems with downlink congestion control, the system comprising:

a base station; and a radio network controller wherein the base station further comprises a transmitter for sending a block discard notification to the radio network controller for preventing downlink congestion, the block discard notification notifying the radio network controller that the base station has discarded at least one transport block;

wherein the radio network controller is a controlling radio network controller: and wherein the controlling radio network controller forwards the block discard notification to serving radio network controllers, the serving radio network controllers serving users affected by the at least one discarded transport block.

7. A system as in claim 6 wherein the block discard notification is sent by the base station to the radio network controller after the base station has discarded at least one transport block.

8. A system as in claim 7 wherein the at least one transport block was previously sent for processing from the radio network controller to the base station.

9. A system as in claim 6 wherein the block discard notification comprises information indicating which transport channels and coded composite transport channels have sustained a discard of at least one transport block.

10. A system as in claim 9 wherein the block discard notification further comprises, for each transport channel that has sustained a discard of at least one transport block, the interval of time within which transport block have been the discarded.

11. A system as in claim 10 wherein the block discard notification further comprises, for each transport channel that has sustained a discard of at least one transport block, the number of transport blocks which have been discarded during the specified interval of time.

12. A system as in claim 9 wherein the block discard notification further comprises, for each transport channel that has sustained a discard of at least one transport block, the number of transport blocks processed.

13. A base station for improving interoperability between a base station and a radio network controller in cellular systems with downlink congestion control, the base station comprises a transmitter for sending a block discard notification to the radio network controller for preventing downlink congestion; wherein the block discard notification comprises information indicating which transport channels and coded composite transport channels have sustained a discard of at least one transport block: and wherein the block discard notification further comprises, for each transport channel that has sustained a discard of at least one transport block, the number of transport blocks processed.

14. A base station as in claim 13 wherein the block discard notification notifies the radio network controller that the base station has discarded at least one transport block.

15. A base station as in claim 13 wherein the block discard notification further comprises, for each transport channel that has sustained a discard of at least one transport block, the interval of time within which transport blocks have been discarded.

16. A base station as in 15 wherein the block discard notification further comprises, for each transport channel that has sustained a discard of at least one transport block, the number of transport blocks which have been discarded during the specified interval of time.

* * * * *